Feb. 11, 1958     H. SINCLAIR     2,822,704
POWER TRANSMISSION SYSTEMS
Filed Oct. 12, 1954
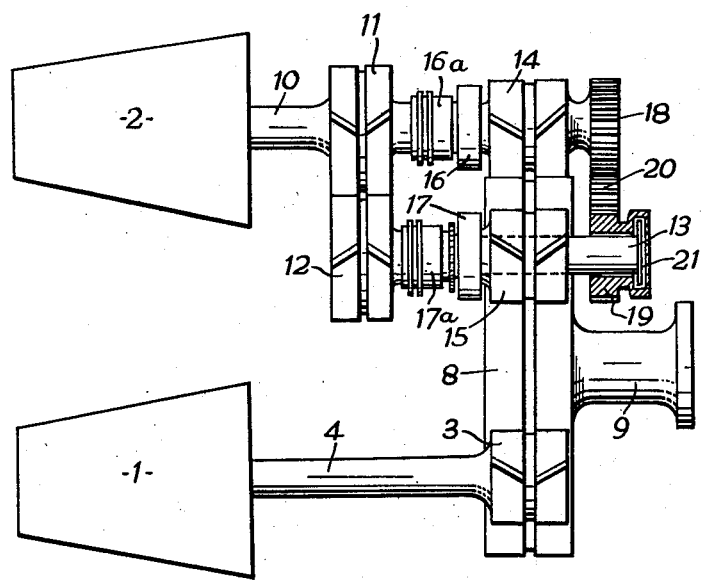
INVENTOR
*Harold Sinclair*
BY
*Benjamin Sweedler*
ATTORNEY

United States Patent Office 2,822,704
Patented Feb. 11, 1958

2,822,704

POWER TRANSMISSION SYSTEMS

Harold Sinclair, Windsor, England

Application October 12, 1954, Serial No. 461,827

4 Claims. (Cl. 74—665)

This invention relates to power transmission systems, particularly but not exclusively for marine propulsion, wherein the prime mover is a turbine, e. g. operated by steam or gas under pressure, drivably connected e. g. through gearing to a load e. g. a propeller.

The worldwide practice in geared marine turbine machinery is to employ at least one turbine for ahead propulsion and another turbine, which normally runs idly, for astern propulsion. The astern turbine entails several points of objection notably thermal expansion effects when brought into operation and energy loss when running idly. In the case of a gas turbine such losses are large enough to be serious. In the case of high pressure / temperature steam turbines there are design difficulties to be overcome such as the effects of differential heating and expansion from the sudden admission of hot steam to the relatively cool casing and rotor. Furthermore, the size of the astern turbine is normally kept down to reduce these difficulties so that the astern power available is usually only 50% to 60% of the ahead power. It is an object of the invention to overcome the difficulties arising from the use of an astern turbine which normally runs idly, and to make it possible to use an atsern turbine of higher efficiency than is customary while largely avoiding the idling losses and heat expansion problems referred to above.

According to this invention there is provided a power transmission system comprising at least one first turbine drivably connected to a driven member to provide forward drive thereof and at least one second turbine together with means for drivably connecting said second turbine to said driven member selectively through forward and reverse power transmission paths.

Since the said second turbine is intended to be used in conjunction with the said first turbine to provide forward drive, and does not therefore need to run idly during normal forward drive, the said second turbine may conveniently be of similar power to the first turbine.

The means for coupling the second turbine to the driven member selectively through forward and reverse power transmission paths may comprise forward and reverse gear trains between the second turbine and the driven member, each train including a pinion which, when the other gear train is operative, rotates idly on its shaft, clutch means being provided for selectively clutching the appropriate pinion to the shaft according to whether the said second turbine is required to provide forward or reverse drive.

A brake may be provided by which the gearing can be brought to rest to enable said clutch means to be operated. Desirably however said clutch means are capable of being operated while the driven member continues to run. The pinion which is in the gear train which is inoperative rotates idly in the opposite direction to its shaft, and in order to clutch the pinion to its shaft where the clutch means comprises dog clutches or synchro-self-shifting clutches, the shaft must first be brought into synchronism or near synchronism with the pinion. This may be achieved by using power from the first turbine or from the driven member, via a controllable clutch and auxiliary gearing associated with the shafts of the forward and reverse gear trains.

An example of the invention as applied to ship propulsion is illustrated diagrammatically in the single figure of the accompanying drawing, wherein the turbine system is of a type that permits of reversal of rotation of the first turbine while the second turbine is in operation, and vice versa.

Referring to the drawing, a first turbine 1 (hereinafter referred to as the "ahead turbine") and a second turbine 2 (hereinafter referred to as the "ahead/astern turbine") are arranged side-by-side with their output shafts parallel to one another. A pinion 3 fixed on the output shaft 4 of the ahead turbine 1 meshes with a gear wheel 8 fast on a propeller shaft 9. The output shaft 10 of the ahead/astern turbine 2 has fixed on it a pinion 11 which meshes with a pinion 12 on a counter shaft 13. A forward drive pinion 14 in mesh with the gear wheel 8 on the propeller shaft 9 is carried by the output shaft 10 of the ahead/astern turbine 2, and a reverse drive pinion 15 also in mesh with the gear wheel 8 is carried by the counter shaft 13. A synchro-self-shifting clutch 16 with locking means in the form of a control sleeve 16a is provided between the forward drive pinion 14 and its shaft i. e. the output shaft 10 of the ahead/astern turbine 2, and a synchro-self-shifting clutch 17 with locking means in the form of a control sleeve 17a is provided between the reverse drive pinion 15 and its shaft, i. e. the counter shaft 13. These synchro-self-shifting clutches 16 and 17 constitute the above-mentioned clutch means.

In ahead drive, the forward drive pinion 14 is clutched to its shaft and the reverse drive pinion 15 rotates idly, and the two turbines 1 and 2 are both drivably connected to the propeller shaft 9 for driving the ship in the ahead direction.

In astern drive, the reverse drive pinion 15 is clutched to its shaft and the forward drive pinion 14 rotates idly. The supply of pressure fluid to the ahead turbine 1 being cut off, the ahead/astern turbine 2 drives the propeller shaft 9 in the astern sense.

In either driving condition, the pinion which runs idly rotates in the opposite direction to its shaft, with the associated clutch 16 or 17 free-wheeling, and in order to engage the appropriate clutch it is necessary to cause the shaft to rotate in the same direction as the pinion and to tend to over-run it. For this purpose, auxiliary gearing and clutch means are provided comprising in the arrangement illustrated a first gear wheel 18 fixed to the forward drive pinion 14, a second gear wheel 19 loose on the counter shaft 13, and an idler gear wheel 20 which is on a lay shaft and which meshes with the first and second wheels 18 and 19. The gear wheel 19 has associated with it clutch means whereby it can be drivably coupled at will to the counter shaft 13. Said auxiliary clutch means may be for example a friction clutch 21, as shown.

In order to change back from manoeuvring to normal ahead drive by both turbines the system is brought to ahead drive by the ahead turbine 1, the power path associated with the ahead/astern turbine 2 is set for ahead drive, and pressure fluid is admitted to the ahead/astern turbine 2.

I claim:

1. A power transmission system comprising a driven gear wheel, at least one forward drive turbine drivably coupled to said driven gear wheel, at least one further turbine, two shafts drivably coupled to said further turbine and drivably coupled to one another for rotation in opposite directions, two pinions mounted one on each of said shafts and meshing with said driven gear wheel, and clutch means operable to selectively clutch either of said pinions to its shaft and allow the other pinion to idle on its shaft.

2. A power transmission system according to claim 1, including means operable for bringing the shaft of the idling pinion substantially into synchronism with said idling pinion.

3. A power transmission system comprising a driven gear wheel, a first turbine, a first shaft drivably coupled to said turbine, a first pinion mounted on said first shaft and meshing with said gear wheel, a first clutch means operable to selectively clutch said first pinion to said first shaft or allow said first pinion to idle on said first shaft, a second shaft, a second pinion mounted on said second shaft and meshing with said gear wheel, second clutch means operable to selectively clutch said second pinion to said second shaft or allow said second pinion to idle on said second shaft, a first reverse train gear wheel drivably coupled to said turbine, a second reverse train gear wheel drivably coupled to said second shaft and meshing with said first reverse train gear wheel, a second turbine, and a pinion drivably coupled to said second turbine and meshing with said driven gear wheel.

4. A power transmission system according to claim 3, including a first synchronising train gear wheel fixed on one of said shafts and meshing with an idler gear wheel, a second synchronising train gear wheel mounted on the other of said shafts and also meshing with said idler gear wheel, and means operable to selectively clutch said second synchronising train gear wheel to said other shaft or allow it to idle on said other shaft.

References Cited in the file of this patent

UNITED STATES PATENTS

| | | |
|---|---|---|
| 2,260,009 | Doran et al. | Oct. 21, 1941 |
| 2,661,633 | Suberkrub | Dec. 8, 1953 |
| 2,720,294 | Hindmarch | Oct. 11, 1955 |

FOREIGN PATENTS

| | | |
|---|---|---|
| 572,773 | Great Britain | Oct. 23, 1945 |